United States Patent
Verdonk

(12) 
(10) Patent No.: US 6,249,674 B1
(45) Date of Patent: Jun. 19, 2001

(54) EMERGENCY DISABLEMENT OF TERMINATION RESTRICTIONS

(75) Inventor: Timothy C. Verdonk, Redmond, WA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/212,649

(22) Filed: Dec. 16, 1998

(51) Int. Cl.⁷ .................................................. H04Q 0/00
(52) U.S. Cl. ......................... 455/404; 455/565; 379/37; 379/45
(58) Field of Search ................................. 455/404, 414, 455/432, 433, 458, 121, 565, 8–9, 17, 462, 110, 411; 579/88.23, 88.25, 196–197, 201, 207, 230; 379/37–51

(56) References Cited

U.S. PATENT DOCUMENTS 5,872,840 * 2/1999 Wu ......................................... 379/197
5,884,193 * 3/1999 Kaplan ................................... 455/565
5,937,052 * 3/1999 Cook-Hellberg ...................... 379/219

* cited by examiner

Primary Examiner—Thanh Cong Le
Assistant Examiner—P. Tran
(74) Attorney, Agent, or Firm—John D. Crane; Bracewell & Patterson, L.L.P.

(57) ABSTRACT

A method and system are disclosed for automatically disabling termination restrictions of a mobile subscriber unit in response to a disconnection of an emergency call originated by said mobile subscriber unit. According to the present invention, a determination is first made that an emergency call has been originated from a mobile subscriber unit to a public safety answering point. Next, in response to a disconnection of the emergency call, a subscriber database that contains the termination restriction is automatically notified that the emergency call has been disconnected. Finally, in response to automatically notifying the subscriber database that the emergency call has been disconnected, the termination restriction is automatically disabled for a limited period of time, such that the public safety answering point may call the mobile subscriber unit back.

21 Claims, 4 Drawing Sheets

EMERGENCY DISABLEMENT OF TERMINATION RESTRICTIONS

BACKGROUND OF THE INVENTION

1. Technical Field

The present invention relates, in general, to an improved wireless communications system. In particular, the present invention relates to a method and system for improving the reliability and success of an attempted call back from a Public Safety Answering Point to a mobile subscriber in the event of a disconnection of an emergency call. Still more particularly, the present invention relates to, in response to a disconnection of an emergency call, automatically disabling termination restrictions of a mobile subscriber unit, at a home location register, for a limited period of time in response to a disconnection of an emergency call originated by the mobile subscriber unit, so that a Public Safety Answering Point is able to call the mobile subscriber unit back.

2. Description of the Related Art

A mobile telephone system typically includes mobile subscriber units that may be mobile or portable, and cellular base stations that are connected to the public telephone company via one or more switching networks. Each mobile subscriber has an assigned cellular telephone number that allows a user to place and receive calls within a widespread range of the cellular base stations, such as throughout a metropolitan area. Mobile telephone subscribers may opt to place certain restrictions, hereinafter termination restrictions, in order to refuse acceptance or to deflect some or all incoming calls. Such termination restrictions include termination denials, toll denials for incoming long distance calls, do-not-disturb restrictions, and call deflections such as call forwarding, call holding, and call waiting. For ease of reference, all types of instructions that interfere with the ability of a mobile subscriber unit to immediately and without delay receive and respond to an incoming call, will be referred to hereinafter as termination restrictions. These termination restrictions are typically implemented as instructions in a home location register (HLR) that serves a mobile subscriber unit (MSU). When a call is sent to a MSU with an applicable termination restriction, a Gateway Mobile Switching Center (G-MSC) is informed by the HLR that the called MSU will not accept the call and the connection will not be made. In the case of a call deflection such as call forwarding, the HLR provides the appropriate destination number which is then utilized to automatically forward the call.

The Emergency Service Bureau (ESB) or more commonly known in the United States as "911" service provides assistance to a person experiencing an emergency. In order to obtain official assistance in case of an emergency, a person may dial a short unique number (such as 911 in the U.S.) to quickly establish a call connection with one of the Public Safety Answering Point (PSAP) terminals providing ESB services. In order to establish the emergency call connection with the PSAP terminal, the directory number associated with the mobile subscriber unit is transmitted to the PSAP. The transmitted directory number or Mobile Station Integrated Service Directory Number (MSISDN, also known as Personal Station Integrated Service Directory Number— PSISDN) is utilized by the PSAP to identify the caller and is also available, if needed, to call back to the mobile subscriber unit if an unintentional disconnect should occur due to lost RF signal, battery failure, etc.

Since it must be assumed that an emergency caller is in dire need of assistance, it is important that every measure be taken to ensure that if the call is unintentionally disconnected, the PSAP may reliably call back the mobile subscriber unit. By utilizing the received MSISDN number, a setup request signal is routed to the Gateway Mobile Switching Center (G-MSC) associated with the destination Public Land Mobile Network (PLMN) which then interrogates the HLR storing subscriber information related to the MSU. The setup request signal is then rerouted to a particular mobile switching center (MSC) currently serving the MSU. However, if an MSU that is utilized to place the emergency call has a termination restriction, the interrogation and rerouting procedures may be ineffective in routing the call from the PSAP to the mobile subscriber unit. The person placing the call is therefore denied effective assistance during an ostensible emergency.

From the foregoing it can be appreciated that a need exists to provide a method and system for automatically disabling termination restrictions of a mobile subscriber unit during an emergency call so that a PSAP terminal can call back to the mobile subscriber unit in the event of an unintentional disconnect.

SUMMARY OF THE INVENTION

It is therefore one object of the present invention to provide an improved wireless communications system.

It is another object of the present invention to improve the reliability and success of an attempted call back from a Public Safety Answering Point to a mobile subscriber in the event of a disconnection of an emergency call.

It is yet another object of the present invention to provide a method and system for automatically disabling termination restrictions of a mobile subscriber unit, for a limited period of time, in response to a disconnection an emergency call originated by the mobile subscriber unit, so that a Public Safety Answering Point is able to call the mobile subscriber unit back.

The above and other objects are achieved as is now described. A method and system are disclosed for automatically disabling termination restrictions of a mobile subscriber unit in response to a disconnection of an emergency call originated by said mobile subscriber unit. According to the present invention, a determination is first made that an emergency call has been originated from a mobile subscriber unit to a public safety answering point. Next, in response to a disconnection of the emergency call, a subscriber database that contains the termination restriction is automatically notified that the emergency call has been disconnected. Finally, in response to automatically notifying the subscriber database that the emergency call has been disconnected, the termination restriction is automatically disabled for a limited period of time, such that the public safety answering point may call the mobile subscriber unit back.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The method of the present invention alleviates this problem by automatically disabling termination restrictions or call forwarding instructions when the emergency call is unintentionally disconnected. Such termination restrictions include termination denial, toll denials for incoming long distance calls, do-not-disturb restrictions, and call deflections such as call forwarding, call holding, and call waiting. For ease of reference, all types of instructions that interfere with the ability of a mobile subscriber unit to immediately and without delay receive and respond to an incoming call, will be referred to hereinafter as termination restrictions.

Figure 1:
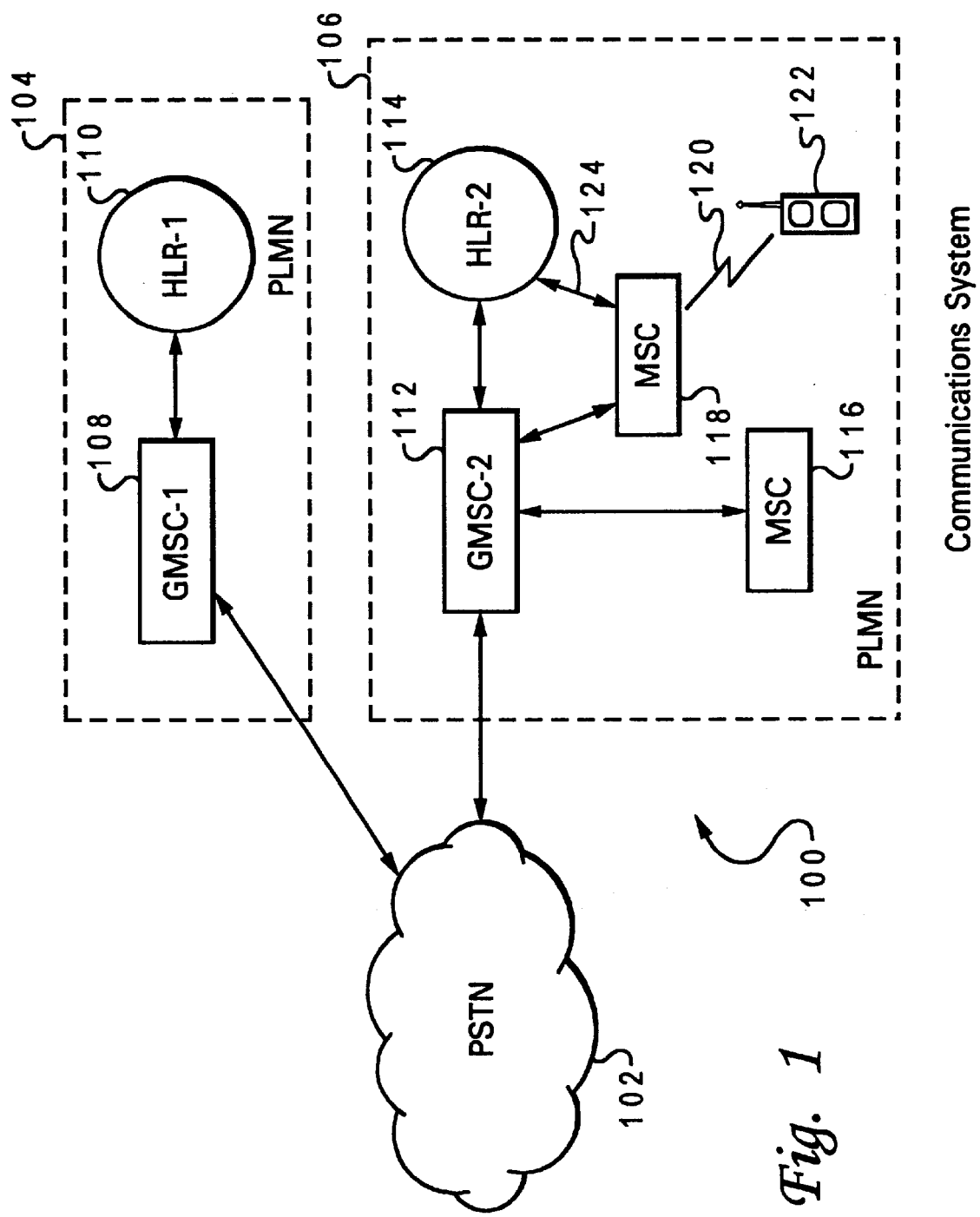
FIG. 1 depicts a diagram of a communications system in which a preferred embodiment of the present invention may be implemented.

With reference now to the figures and in particular with reference to FIG. 1, there is depicted a block diagram illustrative of an example physical configuration of a communications system 100 in accordance with the present invention. FIG. 1 is a block diagram illustrating the network interconnection of multiple Public Land Mobile Networks (PLMN) 104 and 106 to a Public Switched Telephone Network (PSTN) 102. A mobile subscriber unit (MSU) 122 (also known as a mobile terminal or equivalent) is associated with one of the PLMNs as the home PLMN 106. Within each of PLMNs 104 and 106, there are a number of different mobile switching centers (MSC, or also referred to as an MSC/VLR) servicing the geographic area covered by the network. One such MSC/VLR, MSC/VLR 118 communicates with the MSU 122 via a radio channel 120.

MSCs 108, 112, 116 and 118 are responsible for the switching of trunk circuits as well as the processing of call setup and mobility management signaling messages. MSCs 108, 112, 116 and 118 can control system operations in wireless networks. For example, MSCs 108, 112, 116 and 118 can control calls, track billing information, and locate MSU 122. MSCs 108, 112, 116 and 118 are thus switches that provide services and coordination between external networks and mobile cellular telephones utilized in networks such as communications system 100.

Within each of PLMNs 104 and 106, there exists a Gateway Mobile Switching Center (G-MSC) 108 and a G-MSC 112 respectively. G-MSCs 108 and 112, are utilized for routing incoming calls intended for MSU 122 to the appropriate MSC/VLR and, in some instances, may be integrated with an MSC/VLR. As an illustration, if PLMN 106 is the home PLMN for MSU 122, a call initiated within the PSTN 102 is first routed to the GSMC 112. The G-MSC 112 then sends a signal requesting routing information to a Home Location Register (HLR) 114 serving MSU 122 (this step is hereinafter referred to as HLR interrogation). HLRs such as HLR 114 residing within PLMN 106, and HLR 110 that resides within PLMN 104 are utilized to store subscriber information and keep track of the current location of resident MSUs. In response to the request by GMSC 112 for routing information for MSU 122, HLR 114 returns a routing instruction, in the form of a Temporary Location Directory Number (TLDN), back to G-MSC 112. HLR 114 accomplishes this by requesting the TLDN from serving MSC/VLR 118 via a signaling link 124. Signaling link 124 may be established by a direct connection between HLR 114 and MSC/VLR 118. Signaling link 124 may also be established utilized a signaling network. A routing instruction is then utilized to relay the TLDN from HLR 114 to G-MSC 112. The returned routing instruction includes a network address indicating that MSC/VLR 118 is currently serving MSU 122. Upon receipt of such routing information, the G-MSC 112 transmits the incoming call to the indicated MSC/VLR 118. The serving MSC/VLR 118 then establishes a call connection over radio link 120 with MSU 122 located within its MSC/VLR serving area.

Such HLR interrogation by the G-MSC 112 is necessary because MSU 122 is not tied to a fixed line or geographic location. Because MSU 122 can travel freely into any one of the MSC/VLR areas within a given PLMN, the MSC/VLR serving MSU 122 does not stay constant. Whenever MSU 122 travels into a different MSC/VLR coverage area, or when MSU 122 is turned on for the first time, the serving MSC/VLR 118 performs a location update process with the HLR 114 to inform HLR 114 of the MSU's current location. As a result, the HLR 114 retains the current location information regarding the MSU 122 regardless of which MSC/VLR 118 is currently serving the MSU 122. Subsequently, whenever the GMSC 112 interrogates HLR 114, HLR 114 is able to provide the call routing instruction to the MSC/VLR 118 currently serving the MSU 122 by requesting a TLDN from serving MSC/VLR 118 and relaying this TLDN to the G-MSC 112. Utilizing the TLDN received from HLR 114, the GSMC 112 routes the incoming call to the specified MSC/VLR 118.

Figure 2A:
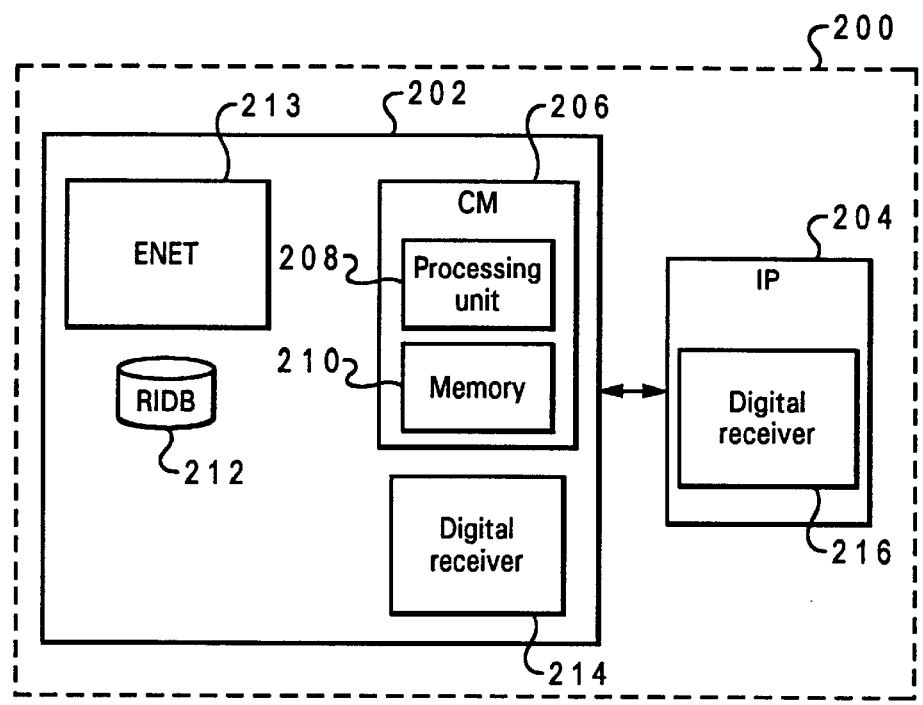
FIG. 2A is a block diagram illustrating components of a switch in which a preferred embodiment of the present invention may be implemented.
Figure 2B:
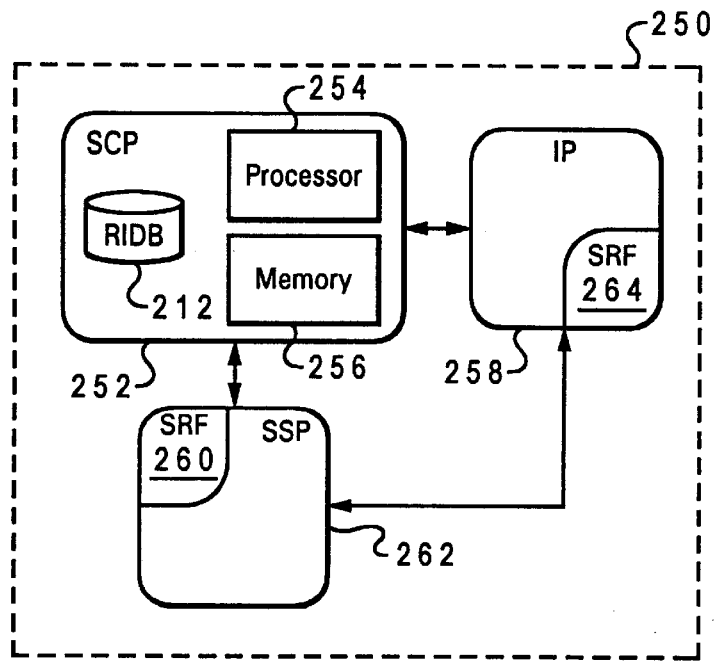
FIG. 2B is a block diagram depicting physical components in an intelligent network in which a preferred embodiment of the present invention may be implemented.

With reference now to FIGS. 2A-2B, block diagrams illustrating different physical configurations for switch components in which a preferred embodiment of the present invention may be implemented are depicted. FIG. 2A is a block diagram of a physical switch 200 representative of the DMS family of switch products available from Northern Telecom Limited in Ottawa, Canada. Switch 200 may be employed within communications system 100 depicted in FIG. 1 as one of MSCs 108, 112, 116, or 118 and provides the functionality described with reference to FIG. 1.

Switch 200 as depicted in FIG. 2A includes a central unit 202 connected to intelligent peripheral (IP) 204. Central unit 202 contains a computing module (CM) 206, which employs processing unit 208 and memory 210 to provide switch intelligence functions for switch 200. Processing unit 208 may comprise, for example, one or more processors executing instructions to provide logic for call processing and to implement processes described below for a preferred embodiment of the present invention. Memory 210 stores instructions and data and may include random access memory (RAM) and/or read only memory (ROM).

Central unit 202 also includes enhanced network (ENET) 212, which provides a switch fabric function. Central unit 202 also includes an integral routing information database (RIDB) 212. Voice server functions for switch 200 are provided by intelligent peripheral (IP) 204, which also contains digital receiver 216. Digital receiver 216 along with another digital receiver 214, that is located within central unit 202, may provide voice recognition functions in place of or in addition to recognizing DTMF tones.

FIG. 2B depicts a block diagram of physical components in an intelligent network 250 representative of a International Telecommunications Union switch, defined by ITUT Q.1200. Network 250 may be implemented within telecommunications network 102 as MSCs 108, 112, 116 or 118 in FIG. 1 in accordance with the preferred embodiment of the present invention. Network 250 includes a service control platform (SCP) 252, which is the switch intelligence for network 250. Within service control platform 252 is a processor unit 254 and a memory 256, which contain the processing logic for providing per call real-time billing rate display in the depicted example. Additionally, service control platform 252 also contains a routing information database (RIDB) 212. Network 250 also contains a service switch platform (SSP) 262, which provides switch fabric functions. Specialized resource functions (SRFs) 260 is found within service switch platform 262. Specialized resource function (SRF) 260 provides DTMF functions for recognizing signals from consumer premises equipment. An intelligent peripheral (IP) 258 also is a part of network 250 and provides voice server functions.

Additionally, within intelligent peripheral 258 is specialized resource function 264, which also serves to provide DTMF functions. Alternatively, instead of DTMF functions, specialized resource functions 260 and 264 may be employed to provide voice recognition in place of or in addition to recognizing DTMF tones.

Although the examples in FIGS. 1, and 2A–2B depict switches as the environments in which the processes of the present invention may be implemented, the processes of may also be implemented in other data processing systems. For example, the processes of the present invention may be implemented within a computer having a connection to a switch, with the computer providing the logic and commands to the switch to execute the processes. Alternatively, the processes may be implemented to operate in an intelligent device operating in conjunction with a switch.

Figure 3:
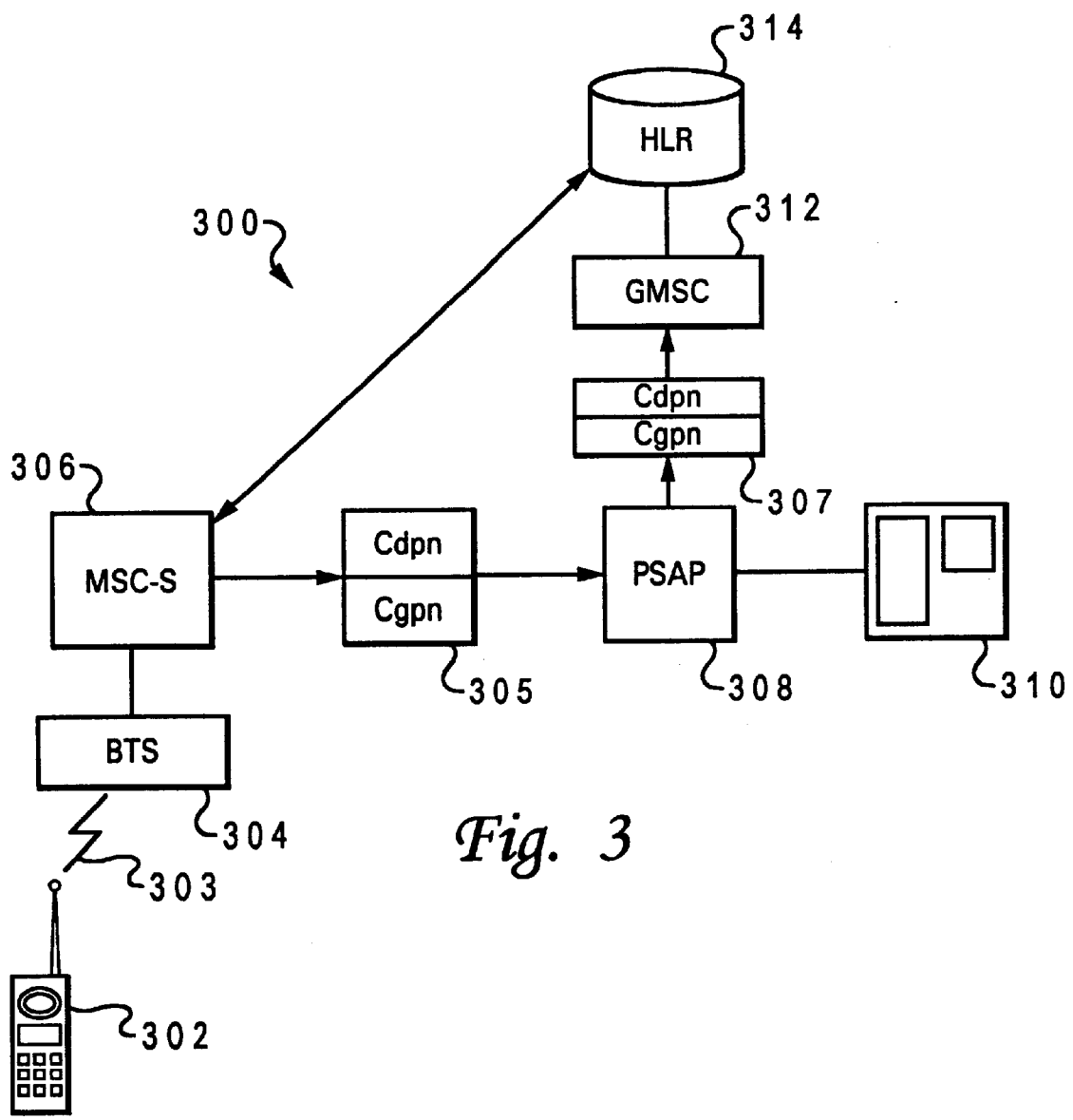
FIG. 3 is a simplified block diagram depicting telecommunications entities involved in establishing a call back connection between a PSAP terminal and a MSU in accordance with a preferred embodiment of the present invention.

FIG. 3 is a simplified block diagram illustrating a telecommunications network 300 utilized in one embodiment of the present invention to establish an emergency call connection between a mobile subscriber unit (MSU) 302 and a Public Safety Answering Point (PSAP) 308. The Emergency Service Bureau (ESB) or more commonly known in the United States as 9-1-1 service provides assistance to a person experiencing an emergency. In order to obtain official assistance in case of an emergency, a person may dial a short unique number (such as 911 in the U.S.) to quickly establish a call connection with a Public Safety Answering Point (PSAP) terminal 310 that provides ESB services. First, mobile subscriber unit (MSU) 302 transmits a call setup signal to a base transceiver station (BTS) 304 over a dedicated channel of a radio link 303. The call setup request signal is then relayed from BTS 304 to a serving MSC 306. In response to receiving the request for an emergency call connection, serving MSC 306 transmits a setup request message 305, to PSAP 308 requesting a call connection. The determination that a particular call is an emergency call is typically based on the digits dialed at MSU 302. In one embodiment of the present invention, setup request message 305 may be referred to as an Initial Address Message (IAM) After receiving setup request message 305 from serving MSC 306, PSAP 308 establishes a call connection between mobile station 302 and PSAP terminal 310.

Setup request message 305 includes both a Calling Party Number (Cgpn) parameter and a Called Party Number (Cdpn) parameter. A Cdpn parameter is analyzed by telecommunications network 300 to determine an intended destination node for a transmitted signal. A Cgpn parameter is stored and later utilized by the destination node in the event of a need to call back the originating caller. For example, the Cgpn parameter of setup request message 305 is transmitted from serving MSC 306 to PSAP 308 and may include a Mobile Station Integrated Service Digital Network (MSISDN) value that specifically identifies MSU 302. Therefore, setup request message 305 is utilized to establish the initial call connection and also a possible means for establishing a call back connection between MSU 302 and PSAP 308.

In the event that the call connection between PSAP terminal 310 and MSU 302 is disconnected, PSAP 308 may attempt to call back to MSU 302. In order to establish a call back connection, PSAP 308 first initiates a call back request to establish a call connection with MSU 302 by transmitting a setup request message 307 to a G-MSC 312. The Cgpn parameter of the first setup request message 305, which, as explained above, may include an encoded MSISDN or TLDN, is utilized as the Cdpn parameter for setup request message 307. In order to establish a call connection with MSU 302, a home HLR 314 is interrogated and G-MSC 312 reroutes the call setup message in a manner similar to that described in FIG. 1. A problem arises, however, if MSU 302 has any termination restrictions applicable under the circumstances. If the termination restrictions are not disabled, HLR 314 will simply return a message indicating that MSU 302 is unavailable or otherwise will not accept the call.

The method of the present invention alleviates this problem by automatically disabling termination restrictions or call forwarding instructions when the emergency call is unintentionally disconnected. Referring again to FIG. 3, serving MSC 306 determines that MSU 302 has originated an emergency call based on the information encoded into the setup request signal received from MSU 302 via BTS 304. When the emergency call is interrupted such that the connection between MSU 302 and PSAP terminal 310 is lost, serving MSC 306 notifies HLR 314 that the emergency call originated by MSU 302 has disconnected. This notification may be accomplished utilizing a parameter (a Qualification Information Code parameter, for example) carried in an ANSI-41 Registration Notification (REGNOT) message or otherwise. In response to receiving notice that an emergency call originated by MSU 302 has been disconnected, HLR 314 records the time at which the notice was received and automatically disables termination restrictions and call forwarding for all incoming call attempts for a predetermined period of time. Therefore, any termination restriction or call forwarding instruction is prevented from interfering with a call back attempt from PSAP 308 to MSU 302 for the duration of the predetermined period of time.

Figure 4:
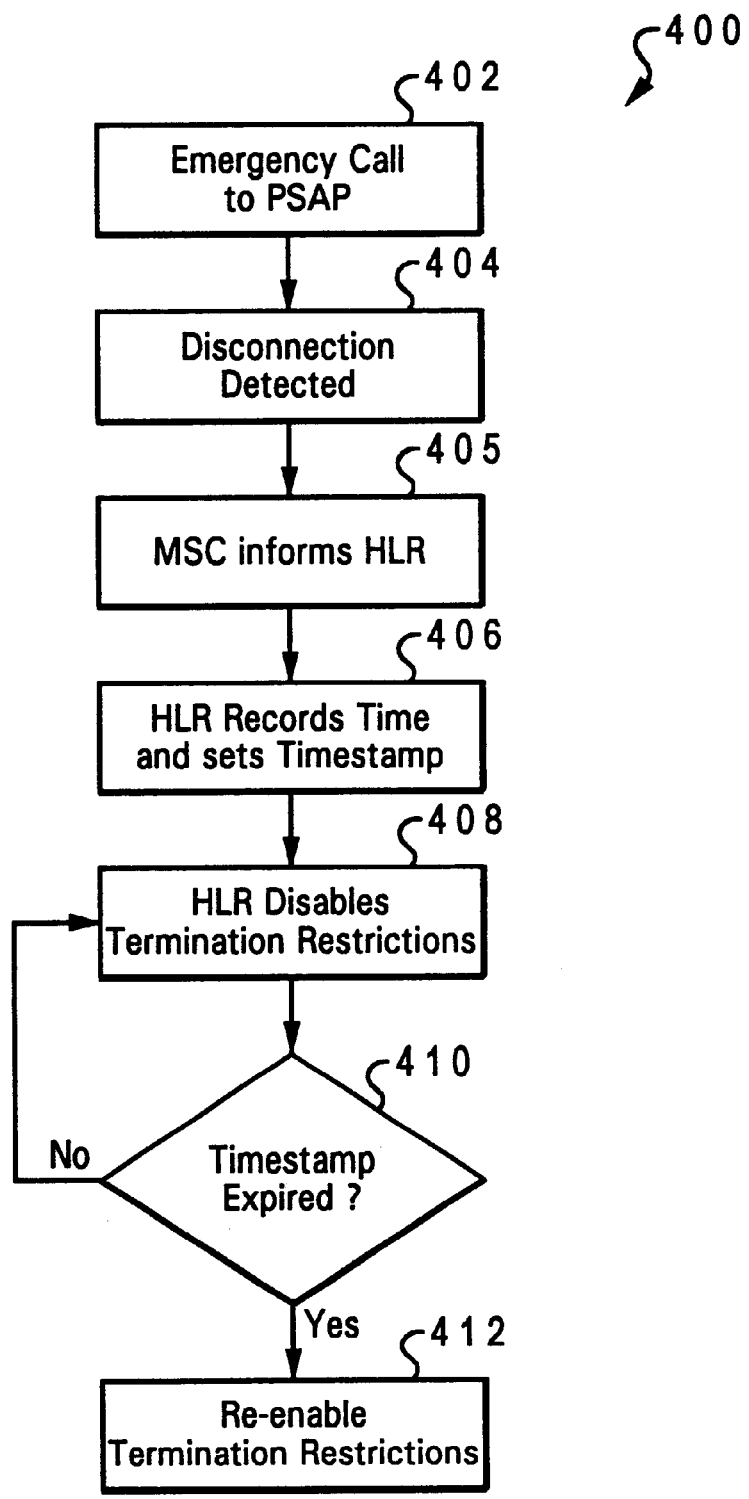
FIG. 4 is a flow diagram illustrating the steps taken by the serving MSC for enabling the PSAP terminal to establish a successful call back connection to a MSU with termination restrictions in accordance with a preferred embodiment of the present invention.

Refer now to FIG. 4 for an understanding of the operations of telecommunications network 300 depicted in FIG. 3 utilized in one embodiment of the present invention. Termination restriction disablement method 400 is a flow diagram illustrating the sequence of steps entailed in automatically disabling termination restrictions for a limited period of time following a disconnect of an emergency call. Initially, as illustrated at step 402, a connection has been established for an emergency call originated from MSU 302 to PSAP terminal 310. While establishing the connection, serving MSC 306 utilizes information encoded into the setup request signal sent from MSU 302 via BTS 304 to identify the call as an emergency call.

Next, as depicted at step 404, serving MSC 306 detects the occurrence of a disconnection of the emergency call.

While detecting the occurrence of a disconnection, serving MSC 306 also makes the determination of whether the disconnection was intentional or not (lost RF signal, for example). Those skilled in the art will appreciate that there are many possible scenarios in which an emergency call can be unintentionally disconnected including, but not limited to, radio frequency signal being lost, a weak battery in a MSU, etc. Those skilled in the art will further appreciate and understand the means by which serving MSC 306 can distinguish an unintentional disconnection from an intentional disconnection (MSU user deliberately terminates the call).

Next, as illustrated at step 405, serving MSC 306 responds to detecting the disconnection by notifying HLR 314 of the disconnection. As depicted in step 406 and 408, HLR 314 records the time at which the disconnection occurred and sets a timestamp that defines the time interval over which the termination restrictions will be disabled. The duration of the timestamp is a predetermined figure (ten minutes for example) that is designed to provide adequate time for a call back connection to be established from PSAP 308 to MSU 302. The termination restrictions within HLR 314 that apply to MSU 302 are then disabled as depicted at step 408 and remain disabled as depicted in steps 408, 410 and 412, until the time period set in the timestamp at step 406 has expired.

It will be appreciated by one skilled in the art, that preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps depicted in FIG. 4, can be accomplished with a computer-aided device. In such a method, data stored in a memory unit of a data-processing system such as a data-processing system, can represent steps in a method for implementing a preferred embodiment of the present invention.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a communications system for automatically disabling termination restrictions of a mobile subscriber unit in response to a disconnection of an emergency call originated by said mobile subscriber unit, said method comprising the steps of:

determining that an emergency call has been originated from a mobile subscriber unit to a public safety answering point, said mobile subscriber unit having a termination restriction;

in response to a disconnection of said emergency call, automatically notifying a subscriber database that said emergency call has been disconnected, said subscriber database including said termination restriction; and automatically disabling said termination restriction, for a limited period of time, in response to said automatically notifying a subscriber database that said emergency call has been disconnected, such that said public safety answering point may establish a call back connection to said mobile subscriber unit.

2. The method of claim 1 wherein said communication system includes a mobile switching center that is currently serving said mobile subscriber unit, and wherein said mobile switching center is utilized to perform the steps of:

determining that an emergency call has been originated from a mobile subscriber unit to a public safety answering point; and in response to said emergency call being disconnected, automatically notifying a subscriber database that said emergency call has been disconnected.

3. The method of claim 2 wherein said mobile switching center informs said subscriber database whether or not said disconnection is intentional.

4. The method of claim 1 wherein said subscriber database is a home location register, said method further comprising the step of:

automatically disabling said termination restriction within said home location register in response to said automatically notifying said home location register that said emergency call has been disconnected.

5. The method of claim 1 wherein said termination restriction is characterized as among a group consisting of termination denials, toll denials for incoming long distance calls, do-not-disturb restrictions, and call deflections such as call forwarding, call holding, and call waiting.

6. The method of claim 1 wherein the step of automatically disabling said termination restriction in response to said automatically notifying a subscriber database that said emergency call has been disconnected is preceded by the steps of:

recording a start time at which said emergency call is disconnected; and defining a time interval over which said termination restrictions will be disabled, said time interval commencing at said start time.

7. The method of claim 6 further comprising the step of:

re-enabling said termination restriction when said time interval has elapsed.

8. A system for automatically disabling termination restrictions of a mobile subscriber unit in response to a disconnection of an emergency call originated by said mobile subscriber unit, said system comprising:

means for determining that an emergency call has been originated from a mobile subscriber unit to a public safety answering point, said mobile subscriber unit having a termination restriction;

means for, in response to a disconnection of said emergency call, automatically notifying a subscriber database that said emergency call has been disconnected, said subscriber database including said termination restriction; and means for automatically disabling said termination restriction, for a limited period of time, in response to said automatically notifying a subscriber database that said emergency call has been disconnected, such that said public safety answering point may establish a call back connection to said mobile subscriber unit.

9. The system of claim 8 wherein said means for determining that an emergency call has been originated from a mobile subscriber unit to a public safety answering point, and said means for, in response to said emergency call being disconnected, automatically notifying a subscriber database that said emergency call has been disconnected, both utilize a mobile switching center, said mobile switching center currently serving said mobile subscriber unit.

10. The system of claim 9 wherein said mobile switching center informs said subscriber database whether or not said disconnection is intentional.

11. The system of claim 8 wherein said subscriber database is a home location register, said home location register utilized as said means for automatically disabling said termination restriction in response to said automatically notifying a subscriber database that said emergency call has been disconnected.

12. The system of claim 8 wherein said termination restriction is characterized as among a group consisting of termination denials, toll denials for incoming long distance calls, do-not-disturb restrictions, and call deflections such as call forwarding, call holding, and call waiting.

13. The system of claim 8 wherein said means for automatically disabling said termination restriction in response to said automatically notifying a subscriber database that said emergency call has been disconnected, further comprises:

means for recording a start time at which said emergency call is disconnected; and means for defining a time interval over which said termination restrictions will be disabled, said time interval commencing at said start time.

14. The system of claim 13 further comprising:

means for re-enabling said termination restriction when said time interval has elapsed.

15. A computer program product stored in signal bearing media for automatically disabling termination restrictions of a mobile subscriber unit in response to a disconnection of an emergency call originated by said mobile subscriber unit, said computer program product comprising:

instruction means stored in signal bearing media for determining that an emergency call has been originated from a mobile subscriber unit to a public safety answering point, said mobile subscriber unit having a termination restriction;

instruction means stored in signal bearing media for, in response to a disconnection of said emergency call, automatically notifying a subscriber database that said emergency call has been disconnected, said subscriber database including said termination restriction; and instruction means stored in signal bearing media for automatically disabling said termination restriction, for a limited period of time, in response to said automatically notifying a subscriber database that said emergency call has been disconnected, such that said public safety answering point may establish a call back connection to said mobile subscriber unit.

16. The computer program product of claim 15 wherein said instruction means stored in signal bearing media for determining that an emergency call has been originated from a mobile subscriber unit to a public safety answering point, and said instruction means stored in signal bearing media for, in response to said emergency call being disconnected, automatically notifying a subscriber database that said emergency call has been disconnected, both utilize a mobile switching center, said mobile switching center currently serving said mobile subscriber unit.

17. The computer program product of claim 16 wherein said mobile switching center informs said subscriber database whether or not said disconnection is intentional.

18. The computer program product of claim 15 wherein said subscriber database is a home location register, said home location register containing instruction means stored in signal bearing media for automatically disabling said termination restriction in response to said automatically notifying a subscriber database that said emergency call has been disconnected.

19. The computer program product of claim 15 wherein said termination restriction is a call deflection instruction.

20. The computer program product of claim 15 wherein said instruction means stored in signal bearing media for automatically disabling said termination restriction in response to said automatically notifying a subscriber database that said emergency call has been disconnected, further comprises:

instruction means stored in signal bearing media for recording a start time at which said emergency call is disconnected; and instruction means stored in signal bearing media for defining a time interval over which said termination restrictions will be disabled, said time interval commencing at said start time.

21. The computer program product of claim 20 further comprising:

instruction means stored in signal bearing media for re-enabling said termination restriction when said time interval has elapsed.

* * * * *